(12) United States Patent
Cormier

(10) Patent No.: US 7,419,347 B1
(45) Date of Patent: Sep. 2, 2008

(54) HITCH-ATTACHED TOOL SUPPORT APPARATUS WITH CRANE

(76) Inventor: John D. Cormier, 473 Cotton La., Eunice, LA (US) 70535

( * ) Notice: Subject to any disclaimer, the term of this patent is extended or adjusted under 35 U.S.C. 154(b) by 166 days.

(21) Appl. No.: 11/287,442

(22) Filed: Nov. 28, 2005

(51) Int. Cl.
 *B60P 9/00* (2006.01)
 *B66C 23/44* (2006.01)
 *B60R 11/00* (2006.01)
 *B60R 9/00* (2006.01)

(52) U.S. Cl. .................. 414/462; 212/180; 224/519; 224/524

(58) Field of Classification Search .............. 414/462, 414/543, 450; 212/180, 302; 224/519, 526, 224/529, 530, 564, 402; 280/763.1; 248/354.1, 248/354.4
See application file for complete search history.

(56) References Cited

U.S. PATENT DOCUMENTS

| | | | |
|---|---|---|---|
| 4,906,015 A | 3/1990 | La Croix et al. | |
| 5,211,526 A | 5/1993 | Robinette | |
| 5,460,304 A * | 10/1995 | Porter et al. | 224/521 |
| 5,570,826 A * | 11/1996 | Garbes et al. | 224/524 |
| 5,993,137 A * | 11/1999 | Harr | 414/550 |
| 6,006,973 A * | 12/1999 | Belinky et al. | 224/510 |
| 6,042,328 A | 3/2000 | McVaugh | |
| 6,082,269 A | 7/2000 | Padberg | |
| 6,089,431 A * | 7/2000 | Heyworth | 224/521 |
| D432,488 S | 10/2000 | Roll et al. | |
| 6,478,528 B1 | 11/2002 | Asbury | |
| 6,921,007 B1 * | 7/2005 | Guerrant | 224/519 |
| 2003/0057244 A1* | 3/2003 | Dorety | 224/519 |
| 2004/0173654 A1* | 9/2004 | McAlister | 224/519 |

* cited by examiner

*Primary Examiner*—Saul J. Rodriguez
*Assistant Examiner*—Gregory W Adams

(57) ABSTRACT

A tool support apparatus for supporting tools from a vehicle hitch receiver includes a tongue bar mountable to a vehicle hitch receiver of a vehicle and extending outwardly from a rear of the vehicle. An outrigger bar is coupled to the tongue bar and is positioned substantially perpendicular to the tongue bar. A pair of stabilizer jacks is rotatably coupled to opposing ends of said outrigger bar. Each of said stabilizer jacks is configured to engage the ground surface to stabilize the outrigger bar and the tongue bar when weight is applied to the tongue bar. A mounting plate is mounted on the tongue bar to receive the tools. The mounting plate has a plurality of mounting apertures extending therethrough.

1 Claim, 8 Drawing Sheets

HITCH-ATTACHED TOOL SUPPORT APPARATUS WITH CRANE

BACKGROUND OF THE INVENTION

1. Field of the Invention

The present invention relates to lifting devices and more particularly pertains to a new lifting device for supporting tools from a vehicle hitch receiver.

2. Description of the Prior Art

The use of lifting devices is known in the prior art. U.S. Pat. No. 6,042,328 describes a device for attachment to a vehicle trailer hitch to lift articles into and out of the vehicle. Another type of lifting device is U.S. Pat. No. 6,478,528 having a crane apparatus mounted to the rear of a vehicle for lifting articles into and out of the vehicle. Another type of lifting device is U.S. Pat. No. 5,211,526 having a mobile crane to moves objects to and from a vehicle.

While these devices fulfill their respective, particular objectives and requirements, the need remains for a system that has certain improved features that has a mounting plate to allow different tools to be mounted to the system and supported from the rear of the vehicle as well as a platform to support articles and to which the articles can be secured to be transported on the system when the vehicle is moving.

SUMMARY OF THE INVENTION

The present invention meets the needs presented above by generally comprising a tongue bar configured for being mounted to a vehicle hitch receiver of the vehicle and extending outwardly from a rear of the vehicle. An outrigger bar is coupled to the tongue bar and is positioned substantially perpendicular to the tongue bar. A pair of stabilizer jacks is rotatably coupled to opposing ends of said outrigger bar. Each of said stabilizer jacks is configured to engage the ground surface to stabilize the outrigger bar and the tongue bar when weight is applied to the tongue bar. A mounting plate is mounted on the tongue bar to receive the tools. The mounting plate has a plurality of mounting apertures extending therethrough.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
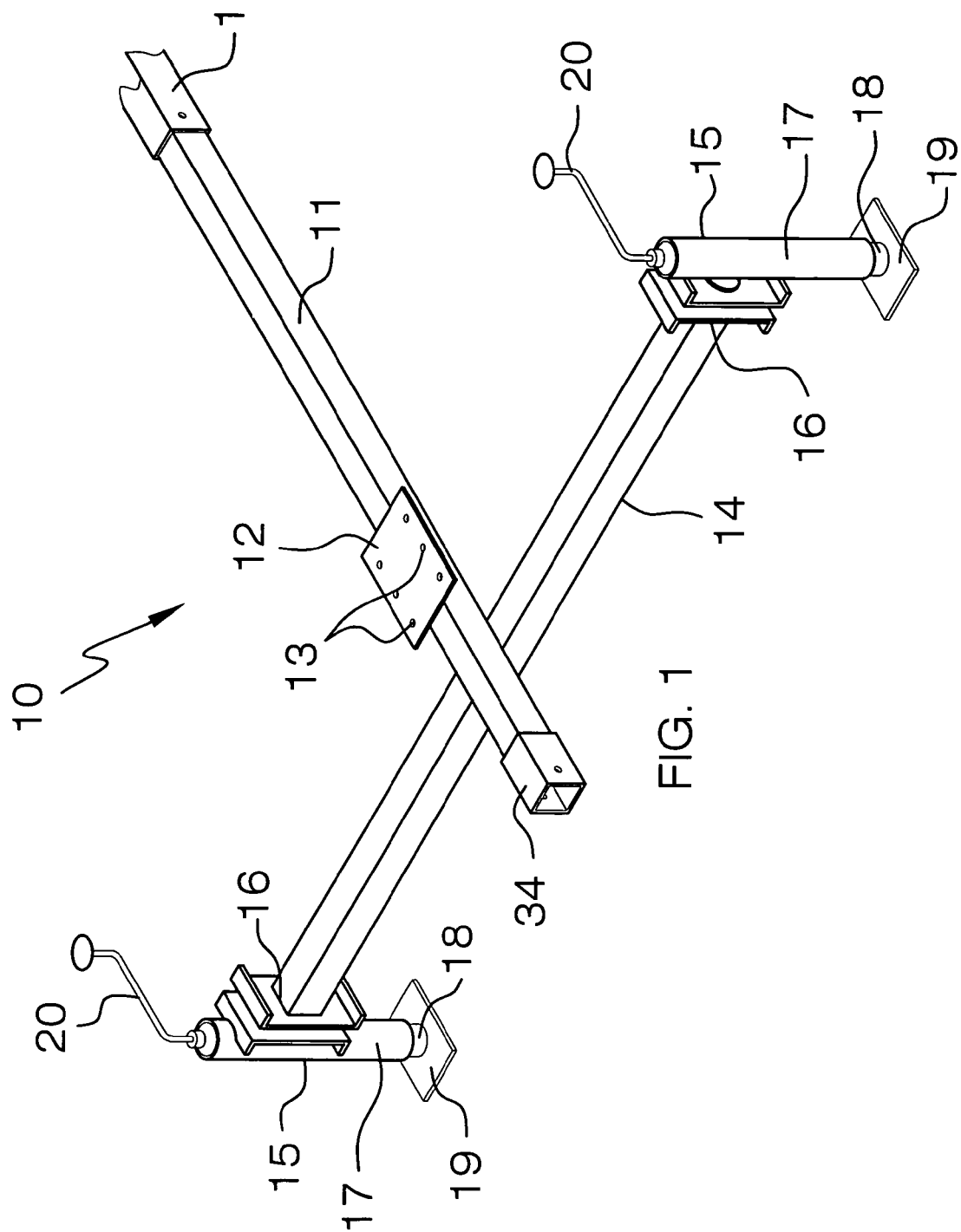
FIG. 1 is a perspective view of a tool support apparatus according to the present invention.
Figure 2:
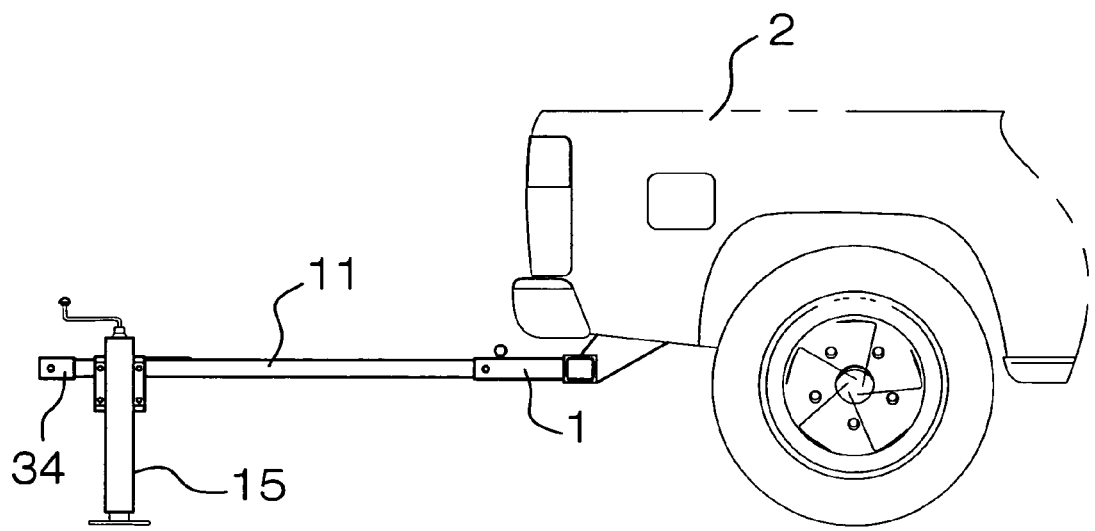
FIG. 2 is a side view of the present invention.
Figure 3:
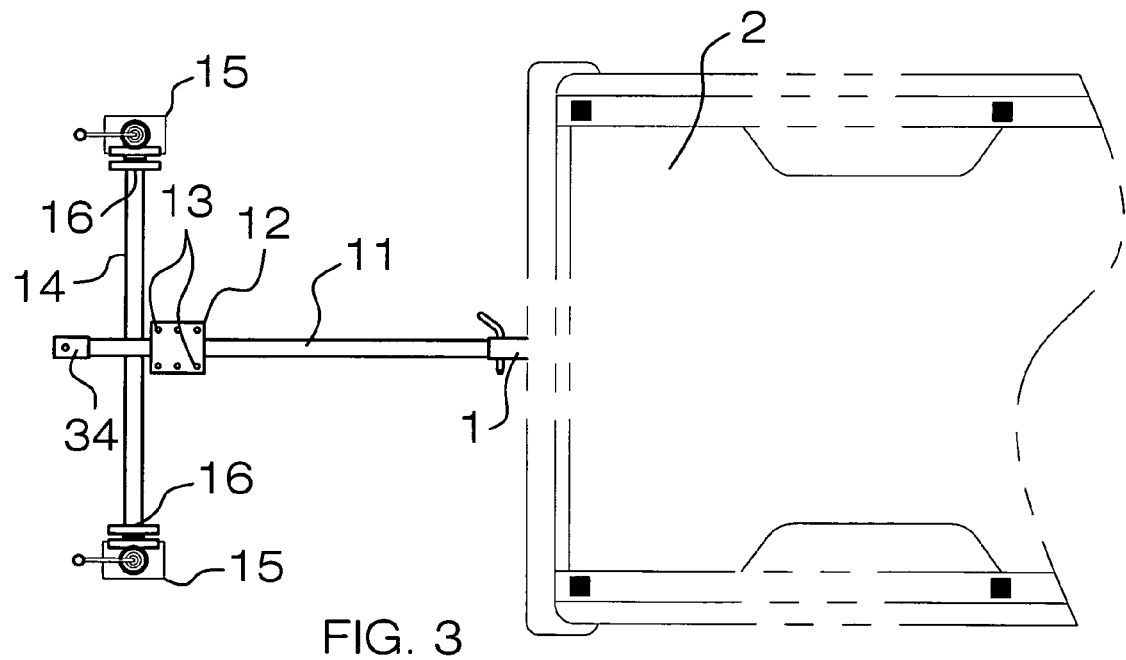
FIG. 3 is a top view of the present invention.
Figure 4:
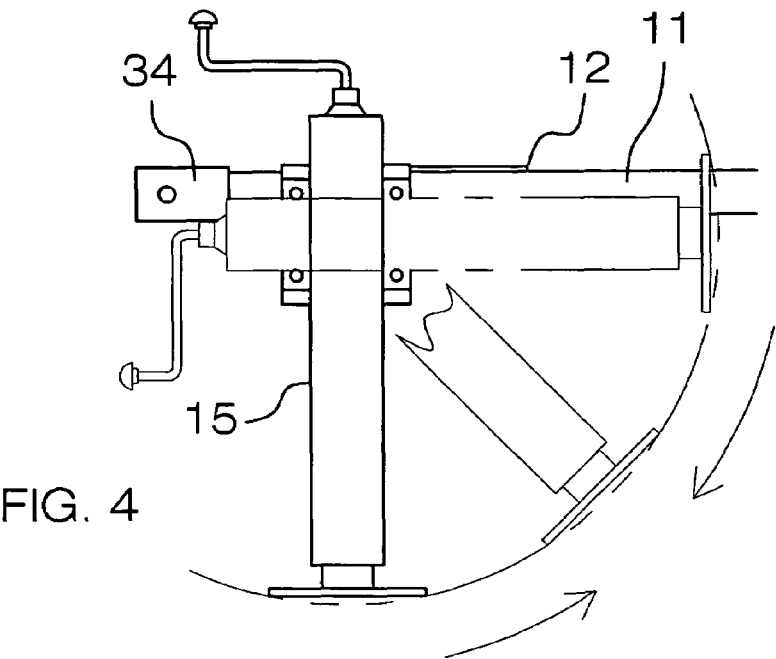
FIG. 4 is an enlarged side view of the stabilizer jacks of the present invention being rotated between the stored and deployed positions.
Figure 5:
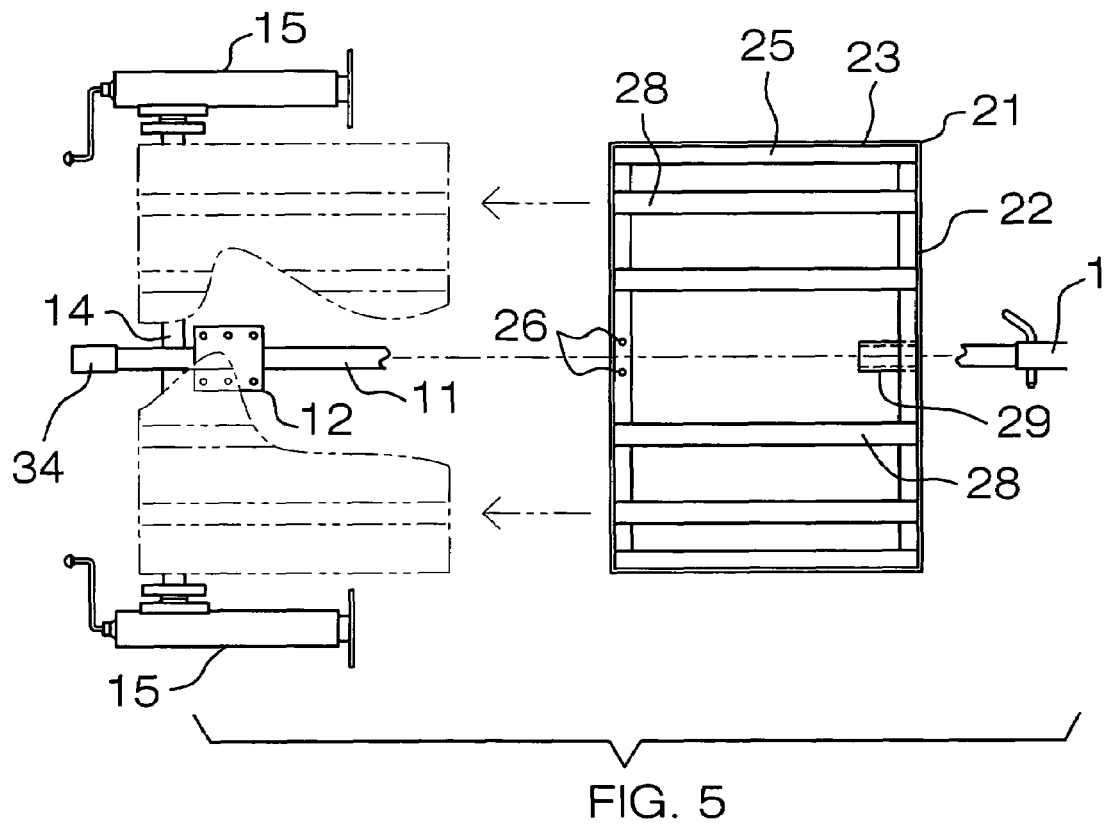
FIG. 5 is a top view of the present invention with the platform positioned on the tongue bar.
Figure 6:
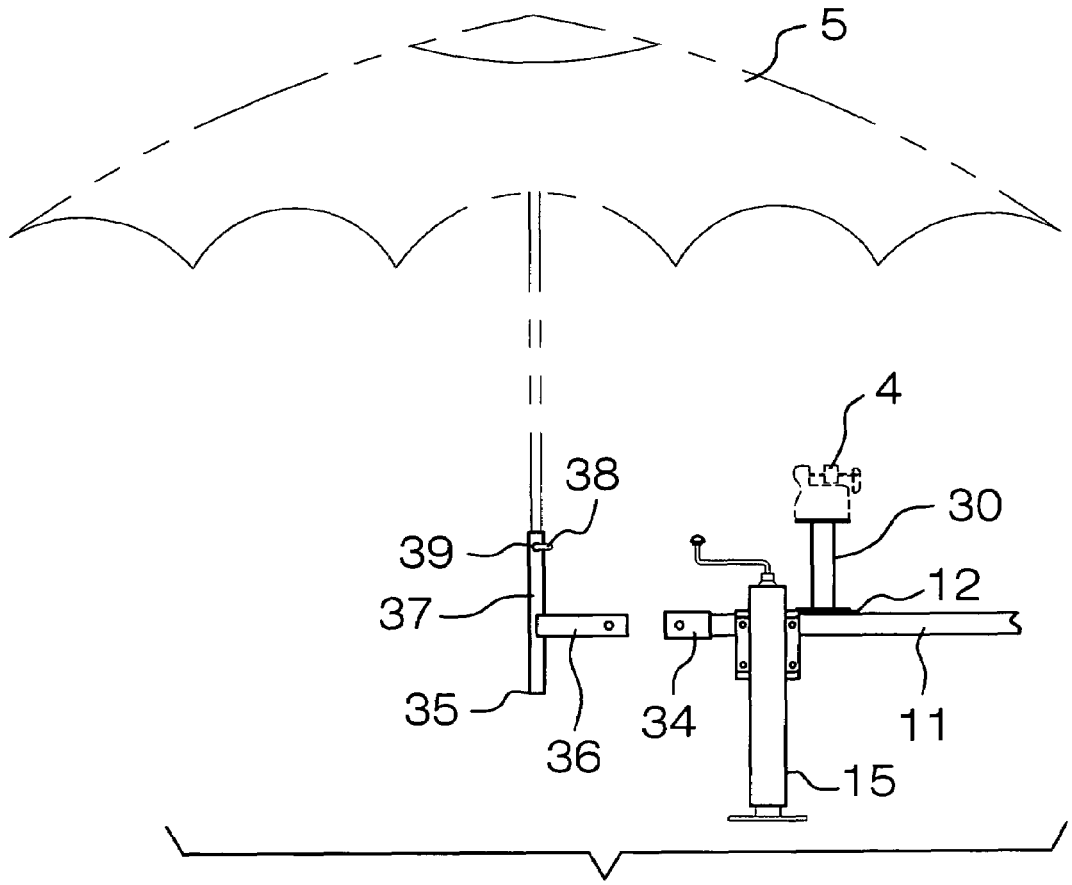
FIG. 6 is a side view of the present invention with the riser member and the umbrella support.
Figure 7:
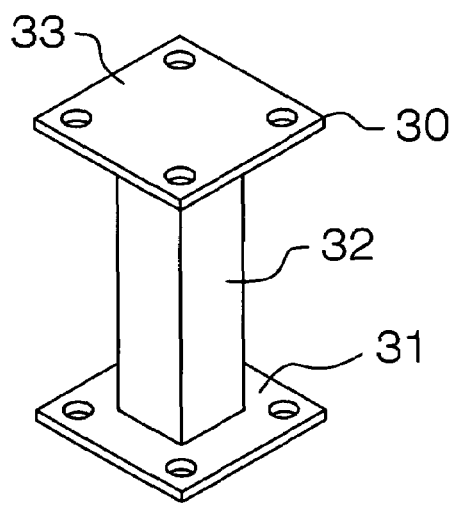
FIG. 7 is a perspective view of the riser member of the present invention.
Figure 8:
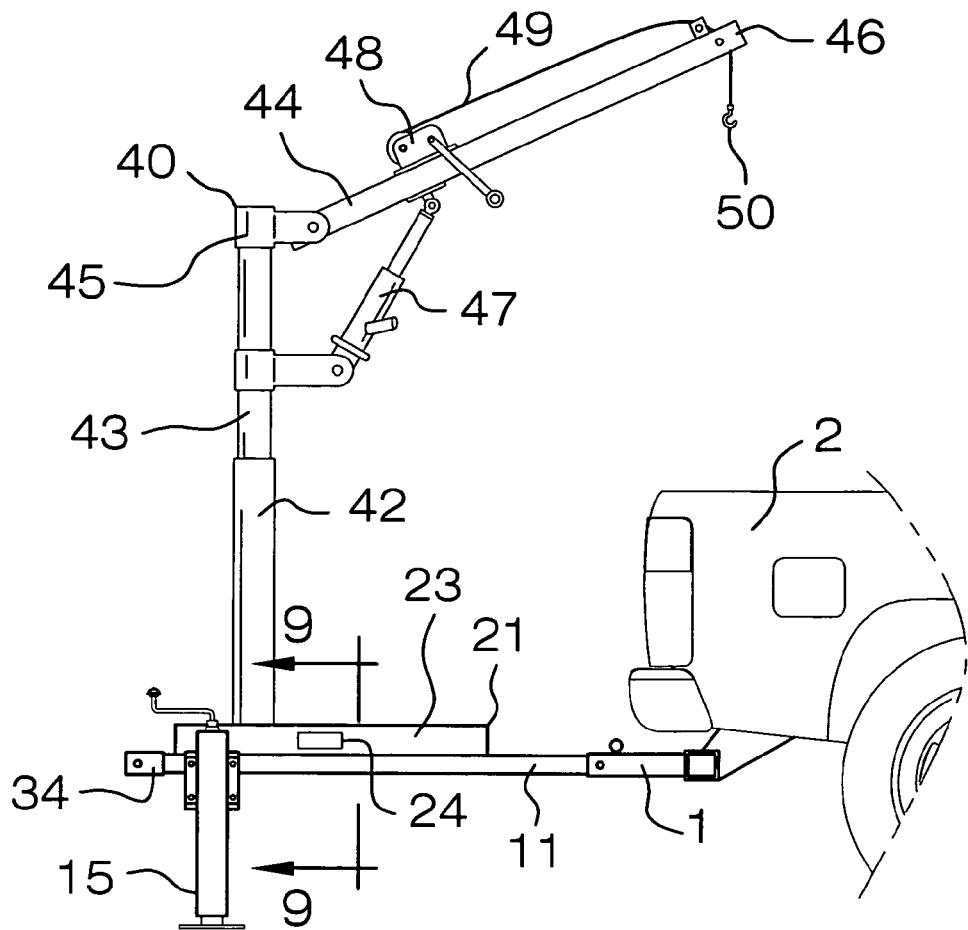
FIG. 8 is a side view of the present invention with the crane in place.
Figure 9:
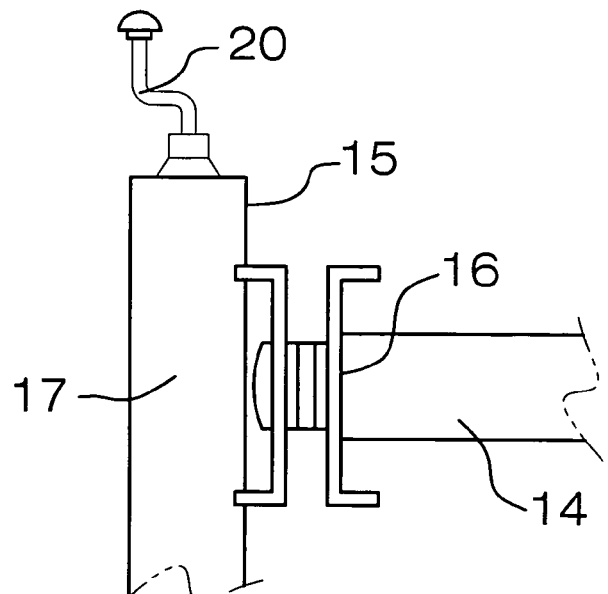
FIG. 9 is a front view of one of the stabilizer jacks of the present invention.
Figure 10:
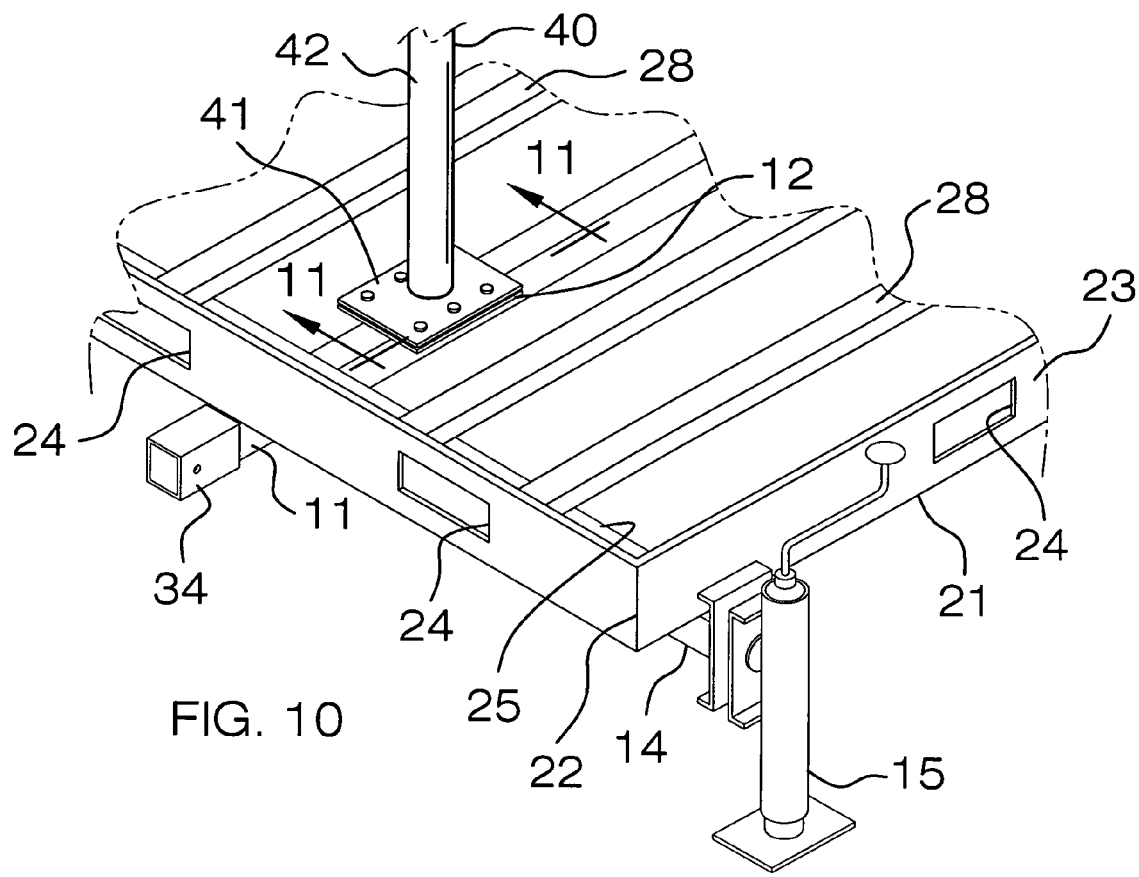
FIG. 10 is a perspective view of the present invention showing the platform slid back to allow the crane to mounted to the mounting plate.
Figure 11:
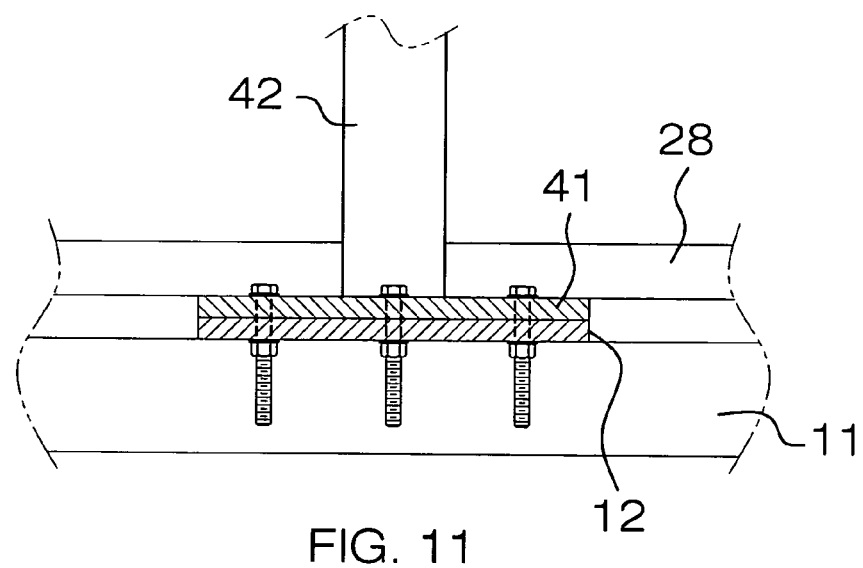
FIG. 11 is a cross-sectional view of the present invention taken along line 11-11 of FIG. 10.
Figure 12:
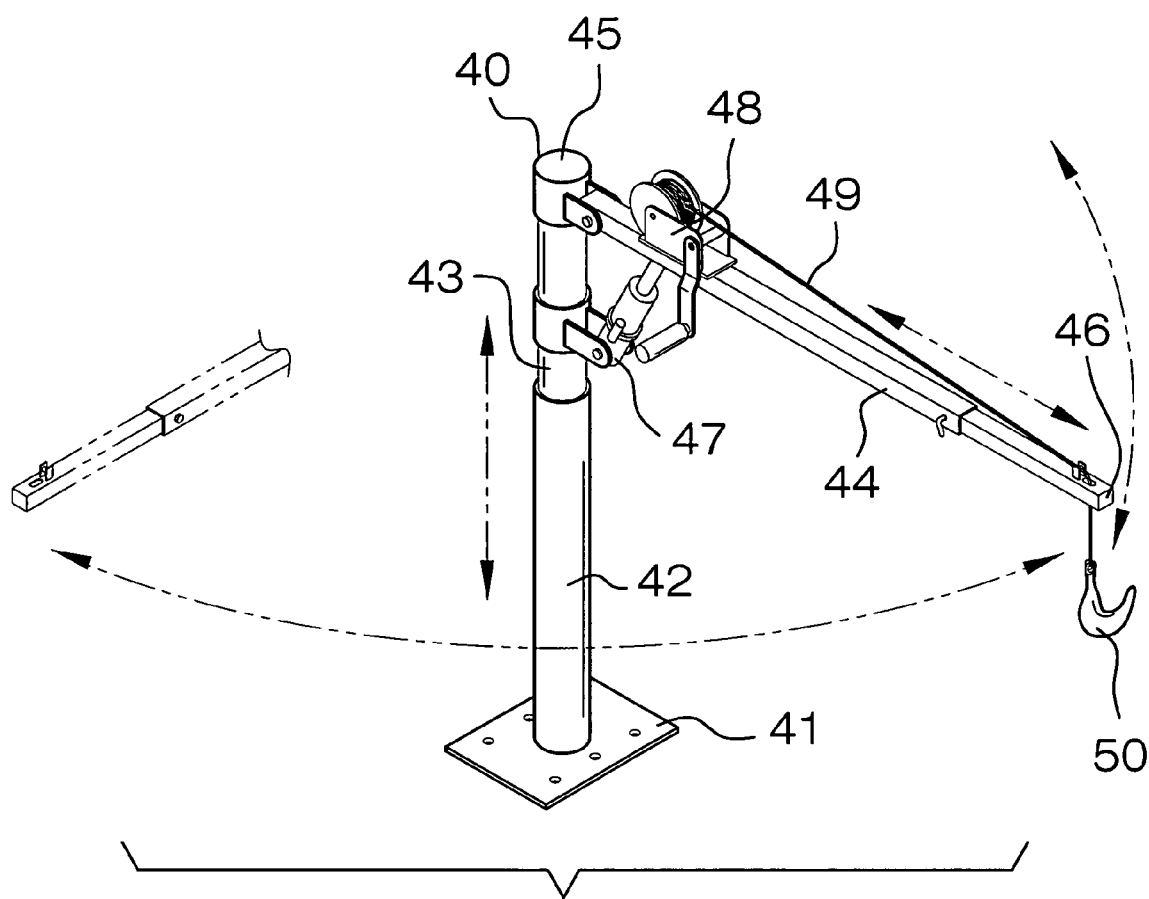
FIG. 12 is a perspective view of the crane of the present invention.
Figure 13:
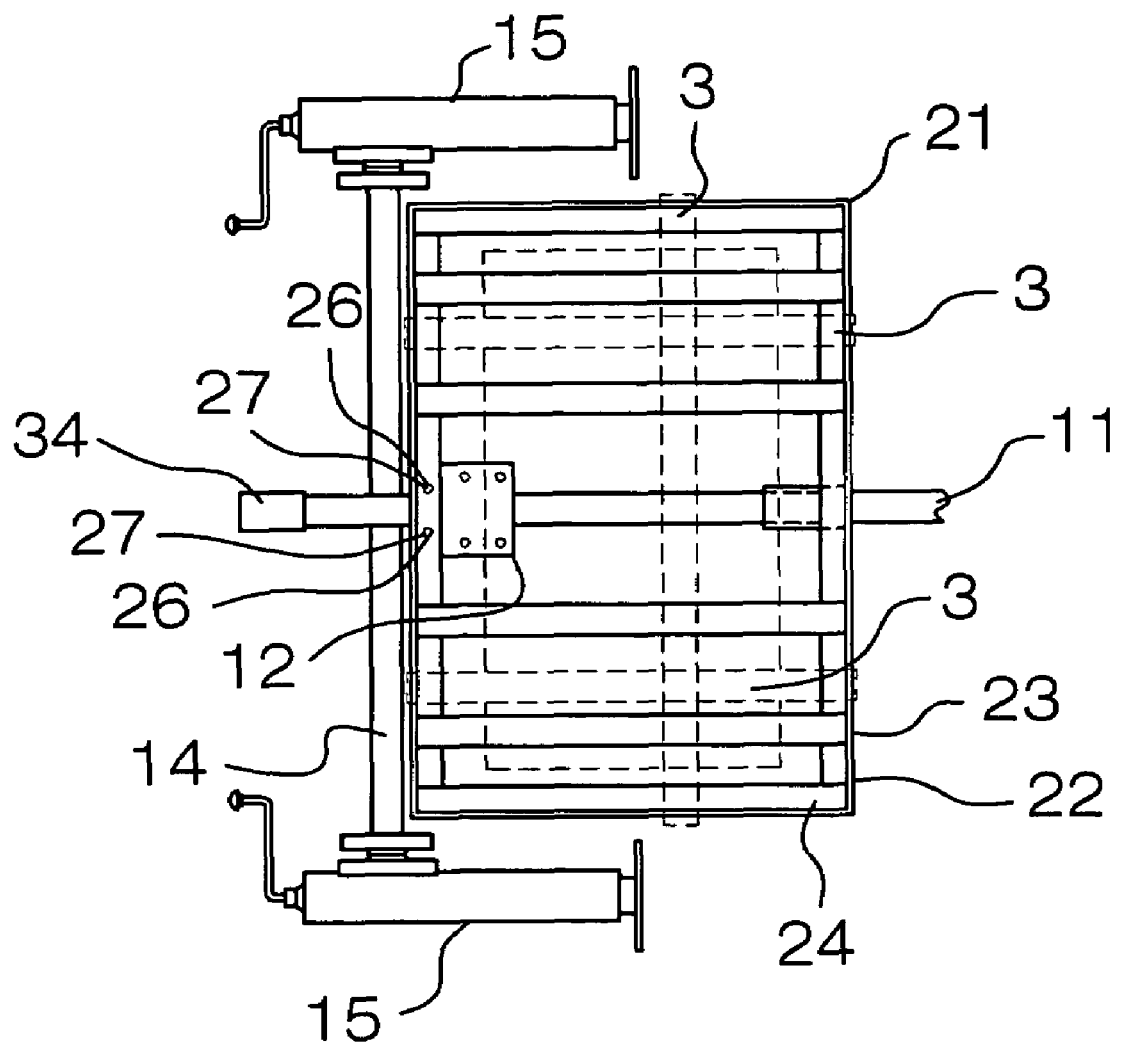
FIG. 13 is a top view of the present invention showing the platform secured to the mounting plate.

With reference now to the drawings, and in particular to FIGS. 1 through 13 thereof, a new lifting device embodying the principles and concepts of the present invention and generally designated by the reference numeral 10 will be described.

As best illustrated in FIGS. 1 through 13, the tool 4 support apparatus 10 generally comprises a tongue bar 12 being configured to be mounted to a vehicle hitch receiver 1 of a vehicle 1 and extending outwardly from a rear of the vehicle 1. A mounting plate 12 is mounted on the tongue bar 12. The mounting plate 12 has a plurality of mounting apertures 13 extending therethrough to permit articles to be mounted to the mounting plate 12 and supported by the tongue bar 12.

An outrigger bar 14 is coupled to the tongue bar 12 and is positioned substantially perpendicular to the tongue bar 12. Each a pair of stabilizer jacks 15 is rotatably coupled to the outrigger bar 14 and positioned at opposing ends 16 of the outrigger bar 14. Each of the stabilizer jacks 15 is configured to engage the ground surface to stabilize the outrigger bar 14 and the tongue bar 12 when weight is applied to the tongue bar 12. Each of the stabilizer jacks 15 is selectively rotated between a deployed position and a stored position. The deployed position is defined by the stabilizer jacks 15 extending substantially downwardly from the outrigger bar 14. The stored position is defined by the stabilizer jacks 15 being rotated to a position orientated substantially parallel with the ground surface to inhibit the stabilizer jacks 15 from inadvertently engaging the ground surface when the vehicle 1 is moving.

Each of the stabilizer jacks 15 comprises a housing 17 rotatably coupled to the outrigger bar 14 to permit rotation of the associated one of the stabilizer jacks 15 between the deployed position and the stored position. An extension arm 18 is slidably coupled to the housing 17 to permit the extension arm 18 to be selectively extended from and retracted into the housing 17. A foot plate 19 is coupled to the extension arm 18 opposite the housing 17. The foot plate 19 is configured to engage the ground surface when the extension arm 18 is extend from the housing 17 and the associated one of the stabilizer jacks 15 is in the deployed position. A crank arm 20 is rotatably coupled to the housing 17 and operationally coupled to the extension arm 18. The crank arm 20 is rotated in a first direction with respect to the housing 17 to extend the extension arm 18 from the housing 17. The crank arm 20 is rotated in a second direction to retract the extension arm 18 into the housing 17.

A platform 21 is slidably coupled to the tongue bar 12 to permit the platform 21 to be slid along a portion of a length of the tongue bar 12. The platform 21 is configured to receive articles to be transported by the vehicle 1. The articles are supported in the platform 21 above the tongue bar 12. The platform 21 includes an angle bar 22 extending around a perimeter of the platform 21. A vertical portion 23 of the angle bar 22 has a plurality of securing apertures 24 configured to receive straps 3 to permit articles to be strapped and secured to the platform 21. A horizontal portion 25 of the angle bar 22 has a pair of locking apertures 26 to be selectively aligned with a pair of the mounting apertures 13 of the mounting plate 12 to permit locking fasteners 27 to extend through the locking apertures 26 and the associated pair of the mounting apertures 13 to secure the platform 21 in a desired position.

Additionally, the platform 21 includes a plurality of latitudinal bars 28 that are coupled to the horizontal portion 25 of the angle bar 22 and extend along a width of the platform 21. The latitudinal bars 28 are configured to support articles placed on the platform 21. The latitudinal bars 28 are positioned on opposing sides of the tongue bar 12 to permit access to the mounting plate 12 through the platform 21 when the platform 21 is slidably coupled to the tongue bar 12. A mounting sleeve 29 is coupled to the angle bar 22 and extends below the angle bar 22. The mounting sleeve 29 slidably receives the tongue bar 12 to permit the platform 21 to slide along a portion of a length of the tongue bar 12 when the platform 21 is not secured to the mounting plate 12.

A riser member 30 is selectively mounted to the mounting plate 12 and is configured to receive a tool 4 and to raise the height of the tool 4 a distance above the tongue bar 12. The riser member 30 includes a securing plate 31 being mountable to the mounting plate 12. A riser bar 32 is coupled to and extends upwardly from the securing plate 31. A tool plate 33 of the riser member 30 is coupled to the riser bar 32 opposite the foot plate 19. The tool plate 33 is configured to permit the tool 4 to be fastened to the tool plate 33.

An accessory hitch receiver 34 is coupled to the tongue bar 12 opposite the vehicle 1. The accessory hitch receiver 34 is configured to receive an accessory to be mounted to the tongue bar 12. An umbrella support 35 is couplable to the accessory hitch receiver 34 to allow the umbrella support 35 to support an umbrella 5 from the accessory hitch receiver 34. The umbrella support 35 includes a support bar 36 couplable to the accessory hitch receiver 34 and extending outwardly from the accessory hitch receiver 34. An umbrella sleeve 37 is coupled to the support bar 36 opposite the accessory hitch receiver 34 and extends upwardly from the support bar 36. The umbrella sleeve 37 is configured to receive the umbrella 5 and allow the umbrella 5 to extend upwardly from the support bar 36. A securing pin 38 is removably insertable into a pin aperture 39 of the umbrella sleeve 37 to engage the umbrella 5 and secure the umbrella 5 to the umbrella sleeve 37.

A crane 40 is couplable to the mounting plate 12 and extends upwardly from the mounting plate 12. The crane 40 is configured to lift articles to be placed in the vehicle 1. The crane 40 includes a base plate 41 couplable to the mounting plate 12 to mount the crane 40 to the mounting plate 12. A base sleeve 42 is coupled to the base plate 41 and extends upwardly from the base plate 41. A stanchion 43 is inserted into the base and is rotatable in the base sleeve 42. A boom arm 44 is pivotally coupled to a free end 45 of the stanchion 43 positioned above the base sleeve 42. The boom arm 44 extending outwardly from the stanchion 43 whereby the boom arm 44 is pivoted in a substantially horizontally arc around the stanchion 43 when the stanchion 43 is rotated with respect to the base sleeve 42. A distal end 46 of the boom arm 44 extends over a portion of the vehicle 1 to permit articles suspended from the distal end 46 of the boom arm 44 to be positioned in the vehicle 1. A ram 47 extends between the stanchion 43 and the boom arm 44. The ram 47 changes an elevation of the distal end 46 of the boom arm 44 when the user actuates the ram 47.

The crane 40 further includes a winch 48 coupled to the boom arm 44. The winch 48 is operationally coupled to a cable 49 to allow a length of the cable 49 to be retracted to and deployed from the winch 48 when the winch 48 is actuated. The cable 49 extends from the winch 48 over the distal end 46 of the boom arm 44. A hook 50 is coupled to the cable 49 opposite the winch 48. The hook 50 is configured to engage the articles to be lifted by the crane 40 to secure the articles to the cable 49 when the cable 49 retracted to and deployed from the winch 48 and the ram 47 is actuated to change the elevation of the distal end 46 of the boom arm 44.

In use, the tongue bar 12 is mounted to the vehicle hitch receiver 1. Each of the stabilizer jacks 15 is rotated to the deployed position and engages the ground to support the outrigger bar 14 and the tongue bar 12. The crane 40 mounted to the mounting plate 12 is then used to lift articles into and out of the vehicle 1. The platform 21 can be used support articles to be transported on the tongue bar 12 when the vehicle 1 is moving and the stabilizer jacks 15 are in the stored position.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tool support apparatus for supporting tools from a back of a vehicle, the apparatus comprising:
    a tongue bar being configured to be mounted to a vehicle hitch receiver of the vehicle and extending outwardly from a rear of the vehicle;
    an outrigger bar being coupled to said tongue bar and being positioned substantially perpendicular to said tongue bar;
    a pair of stabilizer jacks being rotatably coupled to opposing ends of said outrigger bar, each of said stabilizer jacks being configured to engage the ground surface to stabilize said outrigger bar and said tongue bar when weight is applied to said tongue bar, each of said stabilizer jacks being selectively rotated between a deployed position and a stored position, said deployed position being defined by said stabilizer jacks extending substantially downwardly from said outrigger bar, said stored position being defined by said stabilizer jacks being rotated to a position substantially parallel with the ground surface to inhibit said stabilizer jacks from inadvertently engaging the ground surface when the vehicle is moving;

a mounting plate being mounted on said tongue bar, said mounting plate having a plurality of mounting apertures extending theretrough;

a platform being slidably coupled to said tongue bar to permit said platform to be slid along a portion of a length of said tongue bar, said platform being configured to receive articles to be transported by the vehicle wherein the articles are supported in said platform above said tongue bar, said platform comprising;

an angle bar extending around a perimeter of said platform, a vertical portion of said angle bar having a plurality of securing apertures configured to receive straps to permit articles to be strapped and secured to said platform, a horizontal portion of said angle bar having a pair of locking apertures to be selectively aligned with a pair of said mounting apertures of said mounting plate to permit locking fasteners to extend through said locking apertures and the associated pair of said mounting apertures to secure said platform in a desired position;

a plurality of latitudinal bars being coupled to said horizontal portion of said angle bar and extending along a width of said platform, said latitudinal bars being configured to support articles placed on said platform, said latitudinal bars being positioned on opposing sides of said tongue bar to permit access to said mounting plate through said platform when said platform is slidably coupled to said tongue bar;

a mounting sleeve being coupled to said angle bar and extending below said angle bar, said mounting sleeve slidably receiving said tongue bar to permit said platform to slide along a portion of a length of said tongue bar when said platform is not secured to said mounting plate;

a riser member being selectively mounted to said mounting plate and configured to receive a tool and to raise the height of the tool a distance above said tongue bar, said riser member including a securing plate being mountable to said mounting plate, a riser bar being coupled to and extending upwardly from said securing plate, a tool plate of said riser member being coupled to said riser bar opposite said securing plate, said tool plate being configured to permit a tool to be fastened to said tool plate;

an accessory hitch receiver being coupled to said tongue bar opposite the vehicle, said accessory hitch receiver being configured to receive an accessory to be mounted to said tongue bar;

an umbrella support being couplable to said accessory hitch receiver to allow said umbrella support to support an umbrella from said accessory hitch receiver, said umbrella support including a support bar being couplable to said accessory hitch receiver and extending outwardly from said accessory hitch receiver, an umbrella sleeve being coupled to said support bar opposite said accessory hitch receiver and extending upwardly from said support bar, said umbrella sleeve being configured to receive an umbrella and allow the umbrella to extend upwardly from said support bar, a securing pin being removably insertable into a pin aperture of said umbrella sleeve to engage the umbrella and secure the umbrella to said umbrella sleeve;

a crane being couplable to said mounting plate and extending upwardly from said mounting plate, said crane being configured to lift articles to be placed in the vehicle, said crane comprising;

a base plate being couplable to said mounting plate to mount said crane to said mounting plate;

a base sleeve being coupled to said base plate and extending upwardly from said base plate;

a stanchion being inserted into said base, said stanchion being rotatable in said base sleeve;

a boom arm being pivotally coupled to a free end of said stanchion positioned above said base sleeve, said boom arm extending outwardly from said stanchion whereby said boom arm is pivoted in a substantially horizontally arc around said stanchion when said stanchion is rotated with respect to said base sleeve, a free end of said boom arm extending over a portion of the vehicle to permit articles suspended from said free end of said boom arm to be positioned in the vehicle;

a ram being extending between said stanchion and said boom arm, said ram changing an elevation of said free end of said boom arm when said ram is actuated by the user;

a winch being coupled to said boom arm, said winch being operationally coupled to a cable to allow a length of said cable to be retracted to and deployed from said winch when said winch is actuated, said cable extending from said winch over said free end of said boom arm; and a hook being coupled to said cable opposite said winch, said hook being configured to engage the articles to be lifted by the crane to secure the articles to said cable when said cable retracted to and deployed from said winch and said ram is actuated to change the elevation of said free end of said boom arm.

\* \* \* \* \*